United States Patent
Kang et al.

(10) Patent No.: US 9,890,278 B2
(45) Date of Patent: Feb. 13, 2018

(54) THERMOPLASTIC RESIN COMPOSITION WITH REMARKABLE DISCOLORATION RESISTANCE AND IMPACT RESISTANCE

(71) Applicant: SAMSUNG SDI CO., LTD., Yongin-si (KR)

(72) Inventors: Tae Gon Kang, Uiwang-si (KR); Chan Moo Park, Uiwang-si (KR); Yoo Jin Jung, Uiwang-si (KR); Jong Cheol Lim, Uiwang-si (KR); Sang Hyun Hong, Uiwang-si (KR)

(73) Assignee: Lotte Advance Materials Co., Ltd., Yeosu-si (KR)

( * ) Notice: Subject to any disclaimer, the term of this patent is extended or adjusted under 35 U.S.C. 154(b) by 51 days.

(21) Appl. No.: 14/913,471

(22) PCT Filed: Feb. 5, 2014

(86) PCT No.: PCT/KR2014/000969
§ 371 (c)(1),
(2) Date: Feb. 22, 2016

(87) PCT Pub. No.: WO2015/030325
PCT Pub. Date: Mar. 5, 2015

(65) Prior Publication Data
US 2016/0208093 A1    Jul. 21, 2016

(30) Foreign Application Priority Data

Aug. 29, 2013   (KR) .......................... 10-2013-0103130

(51) Int. Cl.
| | |
|---|---|
| C08K 3/22 | (2006.01) |
| C08G 77/38 | (2006.01) |
| C08L 67/02 | (2006.01) |
| H01L 33/00 | (2010.01) |
| C08G 77/04 | (2006.01) |
| C08L 67/00 | (2006.01) |
| C08L 83/04 | (2006.01) |

(52) U.S. Cl.
CPC .............. *C08L 67/02* (2013.01); *C08G 77/04* (2013.01); *C08K 3/22* (2013.01); *C08L 67/00* (2013.01); *C08L 83/04* (2013.01); *C08L 2201/08* (2013.01); *C08L 2205/05* (2013.01); *C08L 2205/08* (2013.01)

(58) Field of Classification Search
USPC .......................................................... 528/25
See application file for complete search history.

(56) References Cited

U.S. PATENT DOCUMENTS

| | | | | |
|---|---|---|---|---|
| 4,618,657 A | * | 10/1986 | Katchko .............. | C09D 167/08 428/447 |
| 5,391,600 A | | 2/1995 | Umeda et al. | |
| 7,009,029 B2 | | 3/2006 | Oka et al. | |
| 2011/0313114 A1 | | 12/2011 | Soyama et al. | |
| 2014/0167088 A1 | * | 6/2014 | Lu ........................... | C08L 67/02 257/98 |
| 2014/0309379 A1 | | 10/2014 | Soyama et al. | |

FOREIGN PATENT DOCUMENTS

| | | |
|---|---|---|
| CN | 102414257 A | 4/2012 |
| KR | 2004-0083815 A * | 10/2004 |
| KR | 10-0495449 B1 | 6/2005 |
| KR | 10-2005-0071167 A1 | 7/2005 |
| KR | 10-1132668 B1 | 4/2012 |
| WO | 2004-076560 A1 | 9/2004 |
| WO | 2015/030325 A1 | 3/2015 |

OTHER PUBLICATIONS

Office Action in counterpart Chinese Application No. 201480048019.1 dated Aug. 1, 2016, pp. 1-6.
International Search Report in counterpart International Application No. PCT/KR2014/000969 dated May 20, 2014, pp. 1-4.

* cited by examiner

*Primary Examiner* — Tae H Yoon
(74) *Attorney, Agent, or Firm* — Additon, Higgins & Pendleton, P.A.

(57) ABSTRACT

The present invention relates to a polyester-based thermoplastic resin composition comprising (A) a polyester resin, (B) a reactive polysiloxane and (C) a white pigment, having remarkable photostability, discoloration resistance and reflectance, thermal resistance, durability and mechanical strength, and capable of remarkably improving impact strength.

15 Claims, No Drawings

THERMOPLASTIC RESIN COMPOSITION WITH REMARKABLE DISCOLORATION RESISTANCE AND IMPACT RESISTANCE

CROSS-REFERENCE TO RELATED APPLICATIONS

This application claims priority to and the benefit of International Application No. PCT/KR2014/000969, filed Feb. 5, 2014, which published as WO 2015/030325 on Mar. 5, 2015, and Korean Patent Application No. 10-2013-0103130, filed in the Korean Intellectual Property Office on Aug. 29, 2013, the entire disclosure of each of which is incorporated herein by reference.

TECHNICAL FIELD

The present invention relates to a thermoplastic resin composition. More particularly, the present invention relates to a polyester-based thermoplastic resin composition having remarkable photostability, discoloration resistance and impact resistance.

BACKGROUND ART

Display devices using a novel light source such as a light emitting diode (LED) and an organic light emitting diode (OLED) have been spotlighted and rapidly replaced existing display devices adopting typical light sources. Such display devices include various components such as a reflector, a reflector cup, a scrambler, a housing, and the like. Materials for such components are required to endure high temperature while minimizing deterioration in reflectance and white index due to a yellowing phenomenon.

As engineering plastics, polyesters, copolymers or blends thereof exhibit useful properties in terms of thermal resistance, impact resistance, processability, and the like, and are applied to various fields including materials for interior and exterior components.

A polyester resin is used as a material for display devices. As a polyester-based thermoplastic resin for display devices, a high thermal resistance polyester resin has not only merits such as no deformation at high temperature and good discoloration resistance, but also a problem of low impact resistance. In order to address this problem, although a polysiloxane compound may be added to the polyester resin to improve impact resistance, this method causes a problem of deterioration in processability such as bleeding out and the like when a large amount of the polysiloxane compound is added to the resin.

U.S. Pat. No. 7,009,029 discloses a polyamide resin composition which includes additives such as a photostabilizer in order to enhance photostability and discoloration resistance of the resin composition and exhibits good thermal resistance and reflectance. However, this polyamide resin composition suffers from deterioration in mechanical properties due to the additives and has difficulty securing long-term photostability and reliability.

Therefore, there is a need for a polyester-based thermoplastic resin that has good mechanical strength and high thermal resistance so as to be applied to a material for display devices and exhibits improved photostability and discoloration resistance without suffering from deterioration in impact resistance and processability.

DISCLOSURE

Technical Problem

The present invention has been conceived to solve such problems in the art and it is one aspect of the present invention to provide a polyester-based thermoplastic resin composition that has remarkably improved impact resistance while exhibiting good properties in terms of thermal resistance, durability, mechanical strength, photostability, discoloration resistance, and reflectance.

It is another aspect of the present invention to provide a molded article produced from the thermoplastic resin composition and exhibiting good properties in terms of photostability, discoloration resistance and impact resistance.

Technical Solution

In accordance with one aspect of the present invention, there is provided a thermoplastic resin composition including: (A) a polyester resin; (B) a reactive polysiloxane; and (C) a white pigment.

The thermoplastic resin composition may include 30 wt % to 85 wt % of the (A) polyester resin, 0.5 wt % to 10 wt % of the (B) reactive polysiloxane, and 10 wt % to 65 wt % of the (C) white pigment.

The reactive polysiloxane may include a composition represented by Formula 1:

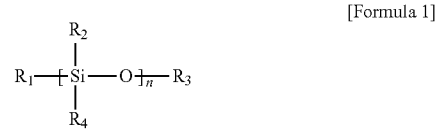

[Formula 1]

(wherein $R_1$ to $R_4$ are each independently one selected from among a $C_1$ to $C_8$ alkyl group, an epoxy group, an amine group, a vinyl group, a (meth)acrylate group, and an acid anhydride group; and n is an integer in the range of $10 \leq n \leq 10{,}000$, provided that $R_1$ to $R_4$ are not a $C_1$ to $C_8$ alkyl group at the same time).

The reactive polysiloxane may have a weight average molecular weight of 3,000 g/mol to 1,000,000 g/mol.

The white pigment may include at least one selected from the group consisting of titanium oxide, zinc oxide, zinc sulfide, white lead, zinc sulfate, barium sulfate, calcium carbonate, aluminum oxide, and mixtures thereof.

The thermoplastic resin composition may further include at least one selected from the group consisting of glass fibers, glass beads, glass flakes, carbon black, clay, kaolin, talc, mica, calcium carbonate, and wollastonite.

In accordance with another aspect of the present invention, a molded article produced from the thermoplastic resin composition is provided.

Advantageous Effects

According to the present invention, the thermoplastic resin composition has remarkably improved impact resistance while exhibiting good properties in terms of thermal resistance, durability, mechanical strength, photostability, discoloration resistance and reflectance.

In addition, the molded article produced from the thermoplastic resin composition according to the present invention exhibits excellent properties in term of discoloration resistance, reflectance and impact resistance without suffering from deterioration in photostability, processability and mechanical strength.

BEST MODE

Hereinafter, embodiments of the present invention will be described in more detail. The following embodiments are provided for complete disclosure and to provide thorough understanding of the present invention by those skilled in the art. Unless otherwise defined herein, all terms including technical or scientific terms used herein have the same meanings as commonly understood by those skilled in the art to which the present invention pertains, and descriptions of known functions and constructions which may unnecessarily obscure the subject matter of the present invention will be omitted.

Unless otherwise stated herein, the term "substituted" means that at least one hydrogen atom is substituted with a halogen atom, a hydroxyl group, a nitro group, a cyano group, an amino group, an azido group, an amidino group, a hydrazino group, a carbonyl group, a carbamyl group, a thiol group, an ester group, a carboxyl group or a salt thereof, a sulfonic acid group or a salt thereof, a phosphate group or a salt thereof, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_6$ to $C_{30}$ aryl group, a $C_6$ to $C_{30}$ aryloxy group, a $C_3$ to $C_{30}$ cycloalkyl group, a $C_3$ to $C_{30}$ cycloalkenyl group, a $C_3$ to $C_{30}$ cycloalkynyl group, or a combination thereof.

In addition, unless otherwise stated herein, the term "(meth)acrylate" means both "acrylate" and "methacrylate", the term "(meth)acrylic acid alkyl ester" means "acrylic acid alkyl ester" and "(meth)acrylic acid alkyl ester", and the term "(meth)acrylic acid ester" means "acrylic acid ester" and "(meth)acrylic acid ester".

The inventors of the present invention have made various attempts to develop a thermoplastic resin composition having excellent impact resistance while exhibiting good photostability and discoloration resistance, and completed the present invention based on the finding that a thermoplastic resin composition including a polyester resin, a reactive polysiloxane and a white pigment can exhibit improved mechanical strength such as impact resistance while maximizing optical efficiency through improvement in photostability, reflectance and discoloration resistance by minimizing deformation at high temperature and deterioration in white index due to a yellowing phenomenon.

A thermoplastic resin composition according to the present invention includes: (A) a polyester resin; (B) a reactive polysiloxane; and (C) a white pigment.

(A) Polyester Resin

Herein, the polyester resin may be used to secure good properties in terms of thermal resistance, mechanical strength, and impact resistance. The polyester resin is an aromatic polyester and has a high melting point due to a cyclic structure thereof.

Specifically, the polyester resin may include an aromatic ring and alicyclic ring structure in the backbone thereof. The polyester resin may have a melting point of 200° C., particularly 220° C. to 380° C., preferably 260° C. to 320° C.

The polyester resin may be prepared through condensation polymerization of an aromatic dicarboxylic acid component and a diol component including an alicyclic diol.

The dicarboxylic acid component may be composed of an aromatic dicarboxylic acid and a derivative thereof. For example, the dicarboxylic acid component may include terephthalic acid, isophthalic acid, phthalic acid, and naphthalene dicarboxylic acid. Preferably, terephthalic acid is used.

The diol component may be an alicyclic diol in order to form a cyclic repeat unit, preferably 1,4-cyclohexanedimethanol (CHDM).

The diol component may further include ethylene glycol (EG) as an aliphatic diol in addition to 1,4-cyclohexanedimethanol. Specifically, the diol component may be composed of 15 wt % to 100 wt % of 1,4-cyclohexanedimethanol and, optionally, 85 wt % or less of ethylene glycol, preferably 30 wt % to 80 wt % of 1,4-cyclohexanedimethanol and 20 wt % to 70 wt % of ethylene glycol. The diol component including ethylene glycol provides impact resistance to the composition without deterioration in thermal resistance of the polyester resin.

The diol component may further include at least one of $C_6$ to $C_{21}$ aromatic diols or $C_3$ to $C_8$ aliphatic diols in order to modify the polyester resin (A). The $C_6$ to $C_{21}$ aromatic diols or the $C_3$ to $C_8$ aliphatic diols may be present in an amount of 3 mol % or less based on 100 mol % of the diol component. Examples of the $C_6$ to $C_{21}$ aromatic diols or the $C_3$ to $C_8$ aliphatic diols may include propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, 1,4-cyclobutanedimethanol, 2,2-bis-(3-hydroxyethoxyphenyl)-propane, 2,2-bis-(4-hydroxypropoxyphenyl)-propane, and the like.

Examples of the polyester resin include polyethylene terephthalate, polytrimethylene terephthalate, polybutylene terephthalate, polyhexamethylene terephthalate, polycyclohexane dimethylene terephthalate, and modified polyester resins obtained by modifying these resins into non-crystalline resins, and these polyester resins may be used alone or as a mixture thereof. For example, a mixture of polyethylene terephthalate and polybutylene terephthalate may be used.

In one embodiment, the polyester resin (A) may include a repeat unit formed by condensation polymerization of terephthalic acid and 1,4-cyclohexanedimethanol and represented by Formula 2:

[Formula 2]

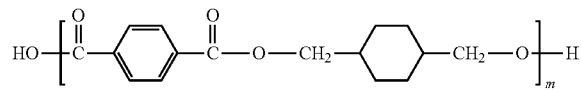

(wherein m is an integer from 10 to 500).

Preferably, the polyester resin is polycyclohexanedimethylene terephthalate (PCT) resin.

The polyester resin (A) may have an intrinsic viscosity [η] of 0.4 dl/g to 1.5 dl/g, preferably 0.5 dl/g to 1.1 dl/g, as measured at 25° C. in an o-chlorophenol solution. If the intrinsic viscosity of the polyester resin is less than 0.4 dl/g, the composition can suffer from deterioration in mechanical properties, and if the intrinsic viscosity of the polyester resin exceeds 1.5 dl/g, the composition can suffer from deterioration in processability.

The aromatic polyester resin may be prepared by typical polycondensation known in the art, and the polycondensation may include direct condensation of an acid through transesterification with a glycol or lower alkyl ester.

In the composition, the polyester resin may be present in an amount of 30 wt % to 85 wt % based on the total weight of (A)+(B)+(C). If the amount of the polyester resin is less than 30 wt %, the thermoplastic resin composition can suffer from deterioration in thermal resistance and mechanical properties, and if the amount of the polyester resin exceeds 85 wt %, the thermoplastic resin composition can suffer from deterioration in processability and photostability.

(B) Reactive Polysiloxane

In the thermoplastic resin composition according to the present invention, the reactive polysiloxane improves miscibility with the polyester resin, thereby preventing deterioration in white index due to a yellowing phenomenon at high temperature while improving mechanical properties such as impact resistance.

The reactive polysiloxane may be a chain-shaped polysiloxane compound having an alkoxy group reacting with an inorganic material and an organic functional group reacting with an organic polymer at a side chain or terminal thereof. Here, the organic functional group may include at least one selected from the group consisting of an epoxy group, an amine group, a vinyl group, a (meth)acrylate group, and an acid anhydride group.

The reactive polysiloxane may be a compound represented by Formula 1:

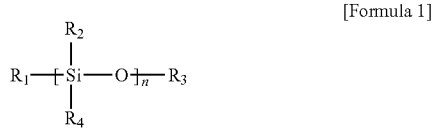

[Formula 1]

(wherein $R_1$ to $R_4$ are each independently one selected from among a $C_1$ to $C_8$ alkyl group, an epoxy group, an amine group, a vinyl group, a (meth)acrylate group, and an acid anhydride group; and n is an integer in the range of $10 \leq n \leq 10{,}000$, provided that $R_1$ to $R_4$ are not a $C_1$ to $C_8$ alkyl group at the same time).

The reactive polysiloxane may have a specific gravity of 0.7 g/cm$^3$ to 1.3 g/cm$^3$ at 25° C., preferably 0.9 g/cm$^3$ to 1.1 g/cm$^3$ at 25° C. Further, the reactive polysiloxane may have an organic functional group equivalent weight of 50 to 5000, preferably 100 to 1000.

Further, the reactive polysiloxane may have a weight average molecular weight of 3,000 g/mol to 1,000,000 g/mol, preferably 5,000 g/mol to 500,000 g/mol. If the weight average molecular weight of the reactive polysiloxane is less than 3,000 g/mol, a molded product of the thermoplastic resin composition can have a poor appearance or can suffer from deterioration in impact resistance, and if the weight average molecular weight of the reactive polysiloxane exceeds 1,000,000 g/mol, the reactive polysiloxane has too high melt viscosity to achieve uniform dispersion in a resin, and can cause deterioration in thermal resistance and processability.

Examples of the reactive polysiloxane may include KF-105, KF-101, KF-102, X-22-173DX, KF-393, KF-864, KF-8012, KF-857, X-22-3667, X-22-162A, X-22-3701E (all produced by Shin-Etsu Chemical Co., Ltd.), TSF4700, TSF4701, TSF4702, TSF4703, TSF4730*, TSF4770 (all produced by GE Toshiba Silicone Co., Ltd.), SF8417, BY16-828, BY-16-849, BY16-892, BY16-853, BY16-837, SF8411, BY16-875, BY16-855, SF8421, SF8418, BY16-874 (all produced by Toray Dow Corning Silicone Co., Ltd.), and the like, and these may be used alone or in combination thereof.

The reactive polysiloxane may be present in an amount of 0.5 wt % to 10 wt %, preferably 1 wt % to 5 wt %, based on the total weight of (A)+(B)+(C). Within this content range of the reactive polysiloxane, the thermoplastic resin composition can have improved impact resistance and mechanical strength without deterioration in discoloration resistance, reflectance, and thermal resistance.

The thermoplastic resin composition according to the present invention may employ a non-reactive polysiloxane which does not contain a functional group at a side chain or terminal thereof, together with the reactive polysiloxane. The non-reactive polysiloxane not containing a functional group is preferably present in an amount of 1 wt % to 10 wt % in the thermoplastic resin composition.

The non-reactive polysiloxane not containing a functional group may be polydimethylsiloxane ((PDMS).

(C) White Pigment

In the thermoplastic resin composition according to the present invention, the white pigment is used to improve white index and reflectance while enhancing discoloration resistance at high temperature.

In one example, the white pigment may include any one component selected from the group consisting of titanium oxide, zinc oxide, zinc sulfide, white lead, zinc sulfate, barium sulfate, calcium carbonate, aluminum oxide, and mixtures thereof.

The white pigment may be modified through surface treatment with a silane coupling agent or a titanium coupling agent. For example, the white pigment may be used after surface modification with a silane compound such as vinyltriethoxysilane, 2-aminopropyltriethoxysilane, 2-glicydoxypropyltriethoxysilane, and the like. In some embodiments, the white pigment may include titanium dioxide. A titanium dioxide pigment serves to improve optical properties such as reflectance and concealing properties. The titanium dioxide pigment may be a typical titanium dioxide pigment, without being limited thereto. The titanium dioxide pigment may be modified through surface treatment with an inorganic surface treatment agent or an organic surface treatment agent. The inorganic surface treatment agent may include aluminum oxide (alumina, Al$_2$O$_3$), silicon dioxide (silica, SiO$_2$), zirconium dioxide (zirconia, ZrO$_2$), sodium silicate, sodium aluminate, sodium aluminum silicate, zinc oxide, mica, and the like. The organic surface treatment agent may include polydimethylsiloxane, trimethylpropane (TMP), pentaerythritol, and the like. The inorganic or organic surface treatment agent may be used in an amount of about 10 parts by weight based on 100 parts by weight of titanium dioxide pigment. The titanium dioxide pigment is preferably coated with alumina (Al$_2$O$_3$). The titanium dioxide pigment coated with alumina may be further modified with an inorganic surface treatment agent such as silicon dioxide, zirconium dioxide, sodium silicate, sodium aluminate, sodium aluminum silicate, and mica, or an organic surface treatment agent such as polydimethylsiloxane, trimethylpropane (TMP), and pentaerythritol.

In some embodiments, the white pigment may be present in an amount of 10 wt % to 60 wt % based on the total weight of (A)+(B)+(C) in the thermoplastic resin composition. If the amount of the white pigment is less than 10 wt %, the thermoplastic resin composition can suffer from deterioration in reflectance and white index, and if the amount of the white pigment exceeds 65 wt %, the thermoplastic resin composition can suffer from deterioration in mechanical properties such as impact resistance.

In some embodiments, the thermoplastic resin composition may further include typical additives such as antioxidants, heat stabilizers, flame retardants, fluorescent whitening agents, plasticizers, thickening agents, antistatic agents, release agents, pigments, nucleating agents, and the like according to purposes of the thermoplastic resin composition within the range of degrading desired effects, without being limited thereto. Examples of the oxidants may include phenol, amine, sulfur, phosphorus-based compounds, and the like; examples of the heat stabilizers may include lactone compounds, hydroquinone, halogenated copper, iodine compounds, and the like; and examples of the flame retardants may include brome, chlorine, phosphorus, antimony, inorganic compounds, and the like.

The present invention provides a molded article produced from the thermoplastic resin composition according to the embodiments of the present invention.

The molded article may have a difference of 15 or less between initial reflectance and post reflectance after being left at 85° C. and 85% relative humidity under an LED light source for 1,000 hours, as measured using a colorimeter at a wavelength of 440 nm.

In addition, the molded article may have a difference of 10 or less between initial yellow index and post yellow index after being left at 170° C. for 500 hours, as measured using a colorimeter.

Next, the present invention will be described in more detail with reference to some examples. It should be understood that these examples are provided for illustration only and are not to be construed in any way as limiting the present invention.

Details of components used in Examples and Comparative Examples were as follows.

(A) Polyester Resin

PCT 0302 produced by SK Chemical Co., Ltd. was used.

(B) Reactive Polysiloxane

Epoxy silicon oil SF8411 produced by Dow Corning Company was used.

(B') Polysiloxane

Polydimethylsiloxane (PDMS) produced by Dow Corning Company was used.

(C) White Pigment

Titanium oxide ($TiO_2$) 2233 produced by KRONOS Co., Ltd. (USA) was used.

(D) Glass Fibers

Glass fiber 910 produced by Owens Corning Co., Ltd. was used.

Examples 1 to 5

Each of thermoplastic resin compositions was prepared using the aforementioned components in amounts as listed in Table 1 through dry blending, and extruded into pellets using a twin-screw extruder (Φ=36 mm) at a nozzle temperature of 250° C. to 310° C. The prepared pellets was dried at 80° C. for 4 hours or more and molded into a specimen, which in turn was evaluated as to the following properties, and evaluation results are shown in Table 1.

Comparative Example 1

A composition was prepared using the components as listed in Table 2 in the same manner as in Example 1 except that the (B) reactive polysiloxane was not used, and evaluation results are shown in Table 2.

Comparative Example 2

A composition was prepared using the components as listed in Table 2 in the same manner as in Example 1 except that the (B') polydimethylsiloxane was used and the (B) reactive polysiloxane was not used, and evaluation results are shown in Table 2.

Comparative Example 3

A composition was prepared using the components as listed in Table 2 in the same manner as in Example 1 except that the (B) reactive polysiloxane was present in an amount of 0.2 wt % in the composition, and evaluation results are shown in Table 2.

(Property Evaluation)

1) GPC

A specimen was dissolved in a solvent, followed by measurement of number average molecular weight, weight average molecular weight, and polydispersion index.

2) Reflectance

Reflectance was measured at a wavelength of 440 nm using a sheet-shaped specimen. For evaluation of reduction in reflectance, initial reflectance (SCI, specular component included) and post reflectance were measured after leaving the specimen under an LED light source at a wavelength of 460 nm in a constant temperature/humidity oven under conditions of 170° C. and 85% RH for 1,000 hours. As a reflectance meter, CM3500d manufactured by (Konica Minolta Holdings, Inc.) was used.

3) Yellow Index

Yellow index of a 2.5 mm thick specimen was measured using Minolta 3600D CIE Lab. Colorimeter in accordance with ASTM D1925. For evaluation of variation in yellow index, an initial yellow index and post yellow index were measured after leaving the specimen under an LED light source at a wavelength of 460 nm in a constant temperature/humidity oven under conditions of 170° C. and 85% RH for 500 hours.

4) IZOD Impact Strength

Impact strength was measured using a ⅛" thick un-notched specimen at 23° C. in accordance with ASTM D256.

TABLE 1

| | | Example 1 | Example 2 | Example 3 | Example 4 | Example 5 |
|---|---|---|---|---|---|---|
| (A) PCT | | 70 | 60 | 58 | 57 | 57 |
| (B) reactive polysiloxane | | 5 | 3 | 3 | 5 | 3 |
| (B') PDMS | | 0 | 2 | 0 | 0 | 2 |
| (C) $TiO_2$ | | 25 | 35 | 19.5 | 19 | 19 |
| (D) glass fiber | | 0 | 0 | 19.5 | 19 | 19 |
| GPC | Mn | 5.0 k | 4.9 k | 4.9 k | 4.9 k | 5.0 k |
| | Mw | 20.1 k | 17.9 k | 18.1 k | 21.8 k | 18.3 k |
| | PDI | 4.0 | 3.7 | 3.7 | 4.4 | 3.7 |
| Izod impact strength (un-notched) | Kgfcm/cm | 32 | 21 | 18 | 23 | 18 |
| Yellow index at 170° C. | Before constant temperature | 2.5 | 2.4 | 3.6 | 3.5 | 3.6 |
| | After constant temperature | 7.3 | 7.1 | 9.8 | 8.6 | 9.5 |
| | Difference | 4.8 | 4.7 | 6.2 | 5.1 | 5.9 |
| Reflectance | Before constant temperature | 94.5 | 95.7 | 93.2 | 93.4 | 93.1 |
| | After constant temperature | 87.2 | 88.7 | 84.2 | 85.4 | 84.3 |
| | Difference | 7.3 | 7.0 | 9.0 | 8.0 | 8.8 |

TABLE 2

|  |  | Comparative Example 1 | Comparative Example 2 | Comparative Example 3 |
|---|---|---|---|---|
| (A) PCT | | 60 | 58 | 60 |
| (B) reactive polysiloxane | | 0 | 0 | 0.1 |
| (B') PDMS | | 0 | 3 | 0 |
| (C) TiO$_2$ | | 20 | 19.5 | 39.9 |
| (D) glass fiber | | 20 | 19.5 | 0 |
| GPC | Mn | 4.9 k | 4.9 k | 4.9 k |
|  | Mw | 11.4 k | 11.4 k | 11.9 k |
|  | PDI | 2.3 | 2.3 | 2.4 |
| Izod impact strength (un-notched) | Kgfcm/cm | 13 | 15 | 17 |
| Yellow index at 170° C. | Before constant temperature | 3.8 | 3.7 | 2.7 |
|  | After constant temperature | 13.8 | 12.6 | 11.8 |
|  | Difference | 10 | 8.9 | 9.1 |
| Reflectance | Before constant temperature | 92.4 | 92.9 | 94.0 |
|  | After constant temperature | 73.8 | 74.2 | 77.1 |
|  | Difference | 18.6 | 18.7 | 16.9 |

As can be seen from Tables 1 and 2, it could be seen that, as compared with the compositions of Comparative Examples 1 to 3, the thermoplastic resin compositions of Examples 1 to 6 did not suffer from significant deterioration in yellow index and reflectance or had low reduction rate thereof, and had remarkably improved impact strength.

Although some embodiments have been described herein, it should be understood by those skilled in the art that these embodiments are provided for the purpose of thorough understanding of the present invention by those skilled in the art and the present invention is not limited thereto. In addition, it should be understood that various modifications, variations, and alterations can be made by those skilled in the art without departing from the spirit and scope of the present invention.

Therefore, the scope of the invention should be limited only by the following claims and equivalents thereof.

The invention claimed is:

1. A thermoplastic resin composition comprising: (A) a polyester resin; (B) a reactive polysiloxane; and (C) a white pigment, wherein the reactive polysiloxane comprises a compound represented by Formula 1:

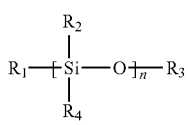

[Formula 1]

wherein R$_1$ to R$_4$ are each independently one selected from a C$_1$ to C$_8$ alkyl group, an epoxy group, an amine group, a vinyl group, a (meth)acrylate group, and an acid anhydride group; and n is an integer in the range of 10≤n≤10,000, provided that R$_1$ to R$_4$ are not all a C$_1$ to C$_8$ alkyl group.

2. The thermoplastic resin composition according to claim 1, comprising: 30 wt % to 85 wt % of the (A) polyester resin; 0.5 wt % to 10 wt % of the (B) reactive polysiloxane; and 10 wt % to 65 wt % of the (C) white pigment.

3. The thermoplastic resin composition according to claim 1, wherein the reactive polysiloxane has a weight average molecular weight of 3,000 g/mol to 1,000,000 g/mol.

4. The thermoplastic resin composition according to claim 1, wherein the white pigment comprises at least one selected from the group consisting of titanium oxide, zinc oxide, zinc sulfide, white lead, zinc sulfate, barium sulfate, calcium carbonate, aluminum oxide, and mixtures thereof.

5. The thermoplastic resin composition according to claim 1, further comprising: at least one selected from the group consisting of glass fibers, carbon fibers, glass beads, glass flakes, carbon black, clay, kaolin, talc, mica, and wollastonite.

6. A molded article produced from the thermoplastic resin composition according to claim 1.

7. The molded article according to claim 6, wherein the molded article has a reflectance difference of 15 or less between initial reflectance and post reflectance after being left at 85° C. and 85% relative humidity under an LED light source for 1,000 hours, as measured using a colorimeter at a wavelength of 440 nm.

8. The molded article according to claim 6, wherein the molded article has a yellow index difference of 10 or less between initial yellow index and post yellow index after being left at 170° C. for 500 hours, as measured using a colorimeter.

9. The thermoplastic resin composition according to claim 1, wherein a molded article produced from the thermoplastic resin composition has a reflectance difference of 15 or less between initial reflectance and post reflectance after being left at 85° C. and 85% relative humidity under an LED light source for 1,000 hours, as measured using a colorimeter at a wavelength of 440 nm, and a yellow index difference of 10 or less between initial yellow index and post yellow index after being left at 170° C. for 500 hours, as measured using a colorimeter.

10. The thermoplastic resin composition according to claim 1, wherein R$_1$ to R$_4$ of the compound represented by Formula 1 are each independently selected from a C$_1$ to C$_8$ alkyl group, an epoxy group, an amine group, a (meth)acrylate group, and an acid anhydride group, provided that R$_1$ to R$_4$ are not all a C$_1$ to C$_8$ alkyl group.

11. The thermoplastic resin composition according to claim 1, wherein the polyester resin (A) comprises an alicyclic structure in the backbone.

12. The thermoplastic resin composition according to claim 11, wherein the polyester resin (A) is prepared through condensation polymerization of an aromatic dicarboxylic acid component and a diol component including an alicyclic diol.

13. The thermoplastic resin composition according to claim 12, wherein the aromatic dicarboxylic acid comprises terephthalic acid and the alicyclic diol comprises 1,4-cyclohexanedimethanol (CHDM).

14. The thermoplastic resin composition according to claim 13, wherein a molded article produced from the thermoplastic resin composition has a reflectance difference of 9 or less between initial reflectance and post reflectance after being left at 85° C. and 85% relative humidity under an LED light source for 1,000 hours, as measured using a colorimeter at a wavelength of 440 nm and a yellow index difference of 6.2 or less between initial yellow index and post yellow index after being left at 170° C. for 500 hours, as measured using a colorimeter.

15. The molded article according to claim 6, wherein the molded article has a reflectance difference of 15 or less between initial reflectance and post reflectance after being left at 85° C. and 85% relative humidity under an LED light source for 1,000 hours, as measured using a colorimeter at a wavelength of 440 nm, and a yellow index difference of 10 or less between initial yellow index and post yellow index after being left at 170° C. for 500 hours, as measured using a colorimeter.

* * * * *